No. 681,672. Patented Sept. 3, 1901.
J. K. ANDREWS.
FLOWER POT.
(Application filed Jan. 15, 1900.)
(No Model.)

Inventor
John K. Andrews,
Witnesses
By Victor J. Evans. Attorney

THE NORRIS PETERS CO., PHOTO-LITHO., WASHINGTON, D. C.

United States Patent Office.

JOHN K. ANDREWS, OF ELGIN, ILLINOIS.

FLOWER-POT.

SPECIFICATION forming part of Letters Patent No. 681,672, dated September 3, 1901.

Application filed January 15, 1900. Serial No. 1,475. (No model.)

*To all whom it may concern:*

Be it known that I, JOHN K. ANDREWS, residing at No. 238 Villa street, in the city of Elgin, Kane county, Illinois, have invented a new and useful Apparatus for Supplying Water for Growing Plants, Seeds, and Vegetation and for Promoting the Growth Thereof, of which the following is a specification.

This invention relates to new and useful improvements in flower-pots; and its primary object is to provide a device of simple construction whereby water may be fed automatically to the seed or roots therein in quantities just sufficient to meet the needs thereof.

To these ends the invention consists in the novel construction and combination of parts hereinafter more fully described and claimed, and illustrated in the accompanying drawings, forming a part of this specification, and its novel features will be defined in the appended claim.

Figure 1:
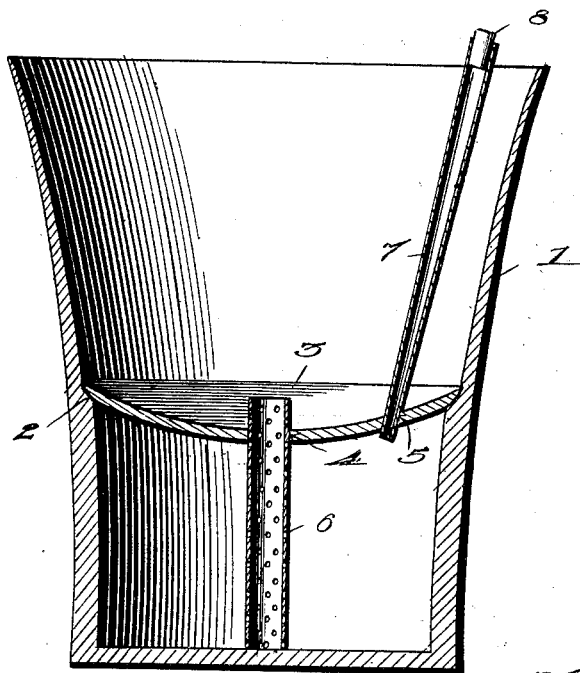
Figure 5:
Figure 2:
Figure 4:

In the drawings, Figure 1 is a central longitudinal section through the device. Fig. 2 is a detail view of the disk detached. Fig. 3 is a similar view of the tube, and Fig. 4 is a detail view of the water-inlet tube.

Referring to the drawings by numerals of reference, 1 is a pot formed of earthenware and having a shoulder 2 formed therein at a point between its ends. This shoulder is adapted to support a concavo-convex disk 3, having perforations 4 and 5 therein. The perforation 4 at the center thereof receives a perforated tube 6, which extends upward from the bottom of the pot to a point within the disk, while perforation 5 contains a tube 7, which extends therethrough from a point above the upper edge of the pot. This latter tube is normally closed by a cork 8 or other suitable means, and the tubes, disk, and pot may all be constructed of the same material. The tube 6 and the upper portion of the pot are filled with earth, and water is admitted to the lower compartment of the pot through tube 7. The tube is then closed, and the air in said pot can only escape through the earth, as is obvious. The earth within tube 6 will absorb the water and convey the same by capillary attraction to a point above the disk, where it will be supplied in sufficient quantities to the plant within the pot.

It will be seen that this device avoids the applying of an excess of water directly to the soil surrounding the seeds or plants. The soil is thus kept open, friable, and amenable to the action of the air, light, and heat, all of which are essential to growing vegetation. It also furnishes a constant and even supply of water just sufficient for the wants of the growing seeds or plants and at the same time stimulates and promotes the growth of vegetation by circulating air through the soil. This circulation of air is accelerated by reason of the pressure of the air through the soil to fill the space left vacant by the depletion of the water in the reservoir.

In the foregoing description I have shown the preferred form of my invention; but I do not limit myself thereto, as I am aware that modifications may be made therein without departing from the spirit or sacrificing the advantages thereof, and I therefore reserve the right to make such changes and modifications as may fairly fall within the scope of my invention.

Having thus fully described my invention, what I claim as new, and desire to secure by Letters Patent, is—

The combination with a pot formed with an internal annular shoulder, of a disk seated on said shoulder and formed with a central opening; a perforated tube open at its upper end and extending through the central opening in the disk and adapted to receive earth when the pot is filled; and a water-supply pipe the lower end of which extends through the disk while its upper end projects above the upper edge of the pot.

JOHN K. ANDREWS.

Witnesses:
RALPH D. HOLLEMBEAK,
HERMAN BECKER.